US 8,708,114 B2
(12) United States Patent
Nemoto

(10) Patent No.: US 8,708,114 B2
(45) Date of Patent: Apr. 29, 2014

(54) ACTIVE VIBRATION DAMPING SUPPORT DEVICE

(75) Inventor: Hirotomi Nemoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 13/258,683

(22) PCT Filed: Mar. 30, 2010

(86) PCT No.: PCT/JP2010/055761
§ 371 (c)(1),
(2), (4) Date: Sep. 22, 2011

(87) PCT Pub. No.: WO2010/113977
PCT Pub. Date: Oct. 7, 2010

(65) Prior Publication Data
US 2012/0013057 A1    Jan. 19, 2012

(30) Foreign Application Priority Data

Mar. 30, 2009 (JP) ................................ 2009-083480

(51) Int. Cl.
*F16F 7/10* (2006.01)
(52) U.S. Cl.
USPC ....................................... 188/378; 267/140.2
(58) Field of Classification Search
USPC ............................ 267/140.14, 140.2; 701/22;
180/65.1–65.8; 477/3–9; 475/5;
188/378
See application file for complete search history.

(56) References Cited

U.S. PATENT DOCUMENTS

| 6,167,860 | B1 * | 1/2001 | Tsukamoto | 123/192.1 |
| 6,192,851 | B1 * | 2/2001 | Asahara et al. | 123/192.2 |
| 6,408,968 | B1 * | 6/2002 | Wakashiro et al. | 180/65.26 |
| 6,820,728 | B2 * | 11/2004 | Raad | 188/267 |
| 6,959,780 | B2 * | 11/2005 | Oshima et al. | 180/299 |
| 7,017,889 | B2 | 3/2006 | Abe | |
| 7,024,290 | B2 * | 4/2006 | Zhao et al. | 701/22 |
| 7,058,487 | B2 * | 6/2006 | Hara et al. | 701/22 |
| 7,099,757 | B2 * | 8/2006 | Niki et al. | 701/22 |

(Continued)

FOREIGN PATENT DOCUMENTS

| JP | 2005-003139 A | 1/2005 |
| JP | 2005-256933 A | 9/2005 |
| JP | 2007-269049 A | 10/2007 |
| JP | 2009-041739 A | 2/2009 |

*Primary Examiner* — Robert A Siconolfi
*Assistant Examiner* — James Hsiao
(74) *Attorney, Agent, or Firm* — Carrier Blackman & Associates, P.C.; Joseph P. Carrier; Anne G. Sabourin

(57) ABSTRACT

A solenoid driving device with excellent electric power efficiency which drives and controls an actuator including a solenoid and an active vibration damping support device with excellent electric power efficiency which includes the solenoid driving device are disclosed. The solenoid driving device includes a booster circuit 120 which boosts a battery voltage, and driving circuits 121A, 121B which an actuator with the electric power supplied and boosted by the booster circuit 120. ACM_ECU200A including a micro computer 200b calculates the magnitude of the vibration of the engine, an engine vibration cycle and a phase lag to obtain the drive frequency $f_{DV}$ of the actuator in the vibration state estimating unit 234 and the phase detecting unit 235. A booster circuit controlling unit 237 of the micro computer 200b determines the target voltage V based on the drive frequency $f_{DV}$. The target voltage V is input to the booster circuit 120, and the booster circuit 120 supplies the required electric power to the driving circuits 121A, 121B at the target voltage V*.

6 Claims, 7 Drawing Sheets

(56) References Cited

U.S. PATENT DOCUMENTS

| | | | |
|---|---|---|---|
| 7,110,867 B2 * | 9/2006 | Imazu | 701/22 |
| 7,344,129 B2 * | 3/2008 | Nemoto | 267/140.14 |
| 7,580,779 B2 * | 8/2009 | Zillmer et al. | 701/22 |
| 7,970,516 B2 * | 6/2011 | Matsumoto et al. | 701/48 |
| 8,082,081 B2 * | 12/2011 | Matsumoto et al. | 701/48 |
| 8,140,230 B2 * | 3/2012 | Haggerty et al. | 701/54 |
| 8,510,007 B2 * | 8/2013 | Mori et al. | 701/69 |
| 2003/0057620 A1 * | 3/2003 | Muramatsu et al. | 267/140.14 |
| 2005/0200061 A1 * | 9/2005 | Nemoto | 267/140.14 |
| 2006/0025905 A1 * | 2/2006 | Zhao et al. | 701/22 |
| 2006/0030979 A1 * | 2/2006 | Kuang et al. | 701/22 |
| 2008/0249689 A1 * | 10/2008 | Matsumoto et al. | 701/48 |
| 2008/0249690 A1 * | 10/2008 | Matsumoto et al. | 701/48 |
| 2009/0039577 A1 * | 2/2009 | Ishiguro et al. | 267/140.13 |
| 2013/0080013 A1 * | 3/2013 | Kobayashi et al. | 701/70 |

* cited by examiner

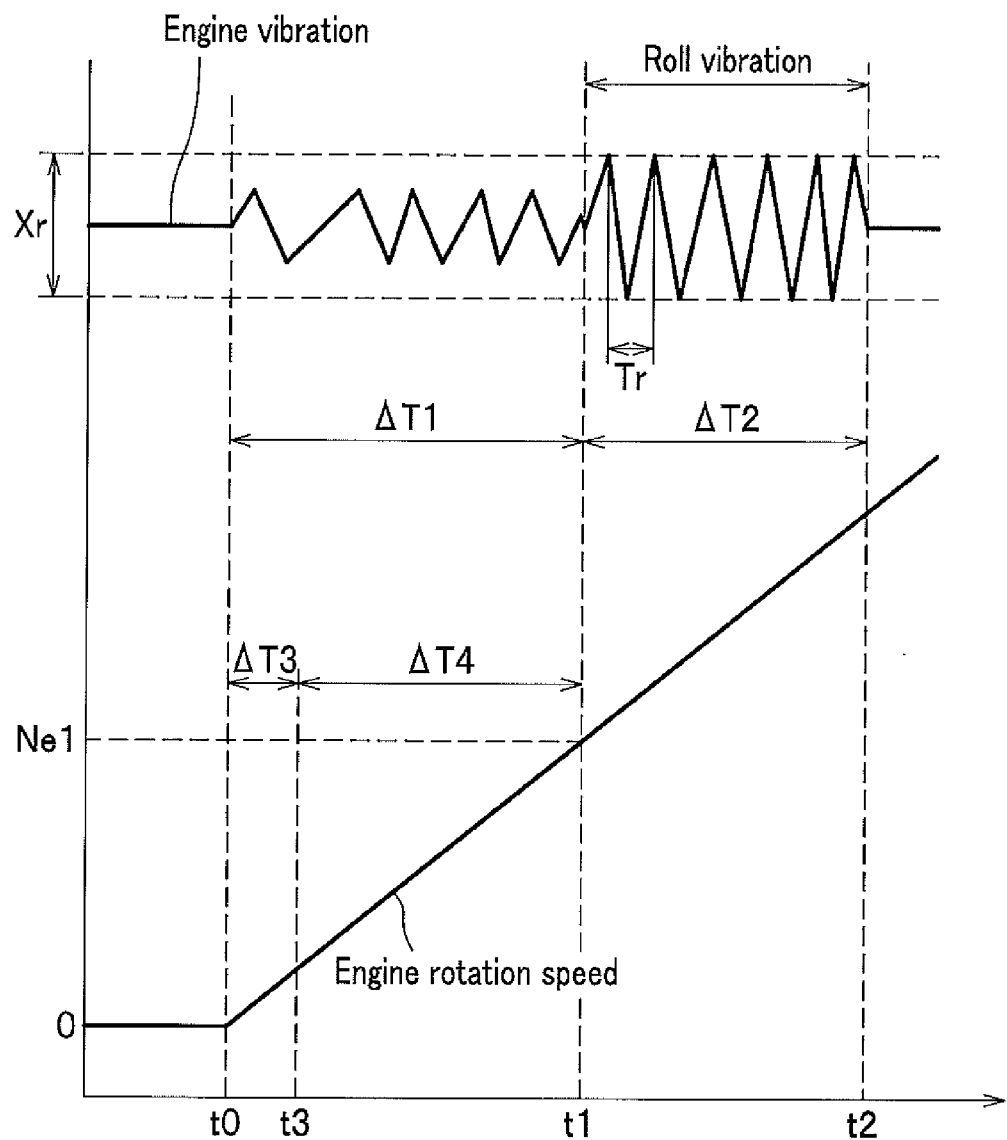

ACTIVE VIBRATION DAMPING SUPPORT DEVICE

FIELD OF THE INVENTION

The present invention relates to an active vibration damping support device which supports an engine of a vehicle and more particularly relates to an active vibration damping support device provided in a hybrid vehicle.

DESCRIPTION OF THE RELATED ARTS

A vehicle has been known which is provided with an active vibration damping support device that absorbs the vibration of an engine equipped in a vehicle to suppress the transmission of the vibration to a vehicle body. For example, a patent document 1 discloses a technique in which an active vibration damping support device is provided in a hybrid vehicle including an electric motor that is an auxiliary driving source of the output of an engine to absorb the vibration generated in the engine.

Patent Document 1: Unexamined Japanese Patent Application Publication No. 2007-269049

SUMMARY OF THE INVENTION

Problem to be Solved by the Invention

However, when the rotation speed of the engine is varied irregularly, such as when the engine is started, it is difficult to predict the status of the vibration of the engine which includes roll vibration, especially, roll proper vibration. Thus, there has been a problem that the engine vibration including roll proper vibration can not be preferably absorbed by the active vibration damping support device and the engine vibration is transmitted to the vehicle body.

When the engine vibration is transmitted to the vehicle body, a driver feels uncomfortable.

An object of the present invention is to provide an active vibration damping support device that predicts the vibration status of roll vibration when the engine is started so as to preferably absorb the roll vibration.

Means to Solve the Problem

In order to solve the problem, the present invention provides an active vibration damping support device which supports an engine started to be driven by an electric motor and absorbs vibration generated in the engine by expansion and contraction of an actuator. The active vibration damping support device is characterized in that when the engine is started, the expansion and contraction of the actuator is started after a predetermined time set in advance has passed since a time when the electric motor is started to be driven.

In accordance with the present invention, the expansion and contraction (control) of the actuator provided in the active vibration damping support device can be started when the predetermined time has passed since the engine was started.

By setting the predetermined time in advance, it is possible to start the control of the actuator of the active vibration damping support device after the set time has been passed since the electric motor was started to be driven to start the engine.

Further, in the active vibration damping support device of the present invention, the active vibration damping support device is provided in a vehicle in which the electric motor can be driven at a predetermined rotation speed set in advance to start the engine.

In accordance with the present invention, the active vibration damping support device can be provided in the vehicle in which the electric motor can be driven at the predetermined rotation speed set in advance to start the engine.

By setting the rotation speed of the electric motor in advance, it is possible to control the rotation speed of the engine when starting the engine.

In the present invention, the predetermined time is a time taken for the rotation speed of the engine driven and rotated by the electric motor to reach a predetermined rotation speed from a stop state.

In accordance with the present invention, it is possible to start the control of the actuator provided in the active vibration damping support device when the rotation speed of the engine reaches the predetermined rotation speed at the start time of the engine.

Further, in the present invention, the predetermined rotation speed is a rotation speed at which roll vibration is generated in the engine.

In accordance with the present invention, it is possible to start the control of the actuator provided in the active vibration damping support device when the roll vibration is generated in the engine at the start time of the engine.

The amplitude and continuation time period of the roll vibration generated when the engine is started have been known to be determined by a time taken for the roll vibration to be generated since the engine was started.

Therefore, by setting the time taken for the roll vibration to be generated since the engine was started, the active vibration damping support device is configured to be capable of accurately predicting the amplitude and the continuation time period of the roll vibration.

If the amplitude and the continuation time period of the roll vibration can be accurately predicted, the active vibration damping support device can be configured to preferably absorb the roll vibration by controlling the operation of the actuator based on the prediction.

Effect of the Invention

In accordance with the present invention, an active vibration damping support device can be provided which accurately predicts the vibration status of the roll vibration when the engine is started so that the roll vibration can be preferably absorbed.

BRIEF DESCRIPTION OF THE DRAWINGS

FIG. 7 is a graph showing changes in the engine rotation speed and the status of the engine vibration.

EMBODIMENTS FOR CARRYING OUT THE INVENTION

An embodiment of the present invention is described in detail below with reference to the accompanying drawings.

Figure 1A:
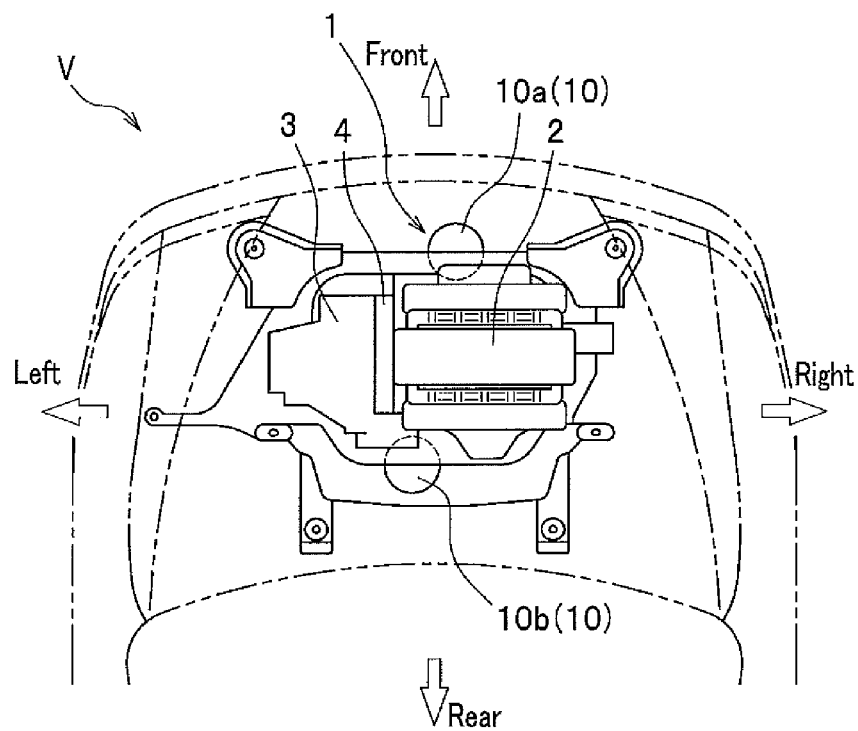
FIG. 1A is a plain view of a hybrid vehicle to which an active vibration damping support device according to an embodiment of the present invention is applied and in which an engine is mounted on the hybrid vehicle.
Figure 1B:
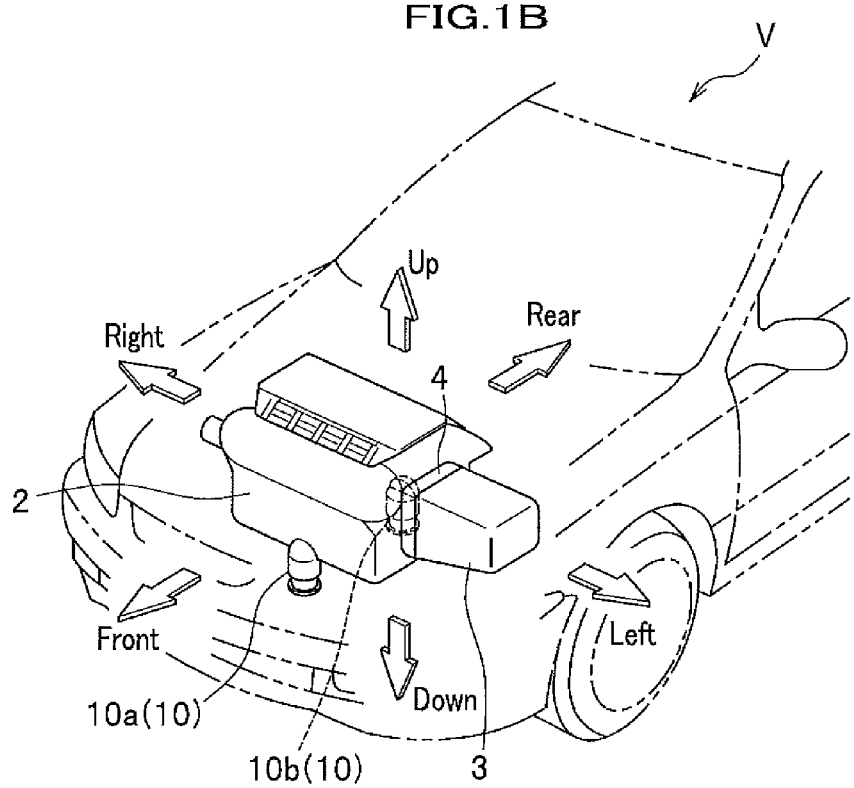
FIG. 1B is a perspective view of the hybrid vehicle to which the active vibration damping support device according to the embodiment of the present invention is applied and in which the engine is mounted on the hybrid vehicle.

An active vibration damping support device 1 according to the embodiment can be driven to expand and contract in a vertical direction, and includes active control mounts (hereinafter, referred to as ACMs) 10 which are used to elastically support an engine 2 of a hybrid-vehicle (vehicle) V in a vehicle body frame and are disposed ahead of and behind the engine 2, respectively, as shown in FIGS. 1A and 1B.

Here, the engine 2 is a so-called side-ways mounted transversal V engine with six-cylinders in which one end of a crankshaft (not shown) is connected to a transmission 3, and the crankshaft is disposed in a direction transverse to a body of the hybrid vehicle V. Therefore, the engine 2 is disposed such that the direction of the crankshaft is in a direction transverse to the body of the hybrid vehicle V, and the ACMs 10 are disposed ahead of and behind the engine 2 as a pair to absorb vibration generated at the engine 2 in a roll direction (a roll vibration). Hereinafter, the ACM 10 which is disposed ahead of the engine 2 of the hybrid vehicle V is referred to as a front ACM 10a and the ACM 10 which is disposed behind the engine 2 is referred to as a rear ACM 10b as appropriate.

The roll vibration is vibration generated in the rotation direction of the crank shaft. If the engine 2 is mounted transversely, the roll vibration is generated in the front-rear direction of the hybrid vehicle V.

The roll vibration is generated when the rotation speed reaches a predetermined rotation speed at the time when the engine 2 is started, for example. Hereinafter, the rotation speed at which the roll vibration is generated in the engine 2 is referred to as a roll vibration rotation speed. The roll vibration rotation speed of the rotation speed of the engine 2 corresponds to a predetermined rotation speed recited in Claims.

The roll vibration rotation speed is a value determined by the characteristic of the engine 2, such as its weight or character frequency and can be determined in advance by an experiment or the like.

The hybrid vehicle V also includes an electric motor 4 which is an auxiliary driving force of the engine 2.

For example, the electric motor 4 used in a hybrid system "IMA (Integrated motor assist) system" the applicant has invented is a thin DC brushless motor which is sandwiched between the engine 2 and the transmission 3 and is directly connected to the engine 2. The electric motor 4 generates a large output torque to assist the engine 2 when the load of the engine 2 is large, such as when the vehicle is accelerated.

The rotation speed of the electric motor 4 when the hybrid vehicle V is running is set by the engine ECU 61 which is described later (see FIG. 2) based on the rotation speed of the engine 2 by using an algorithm set in advance.

Further, the engine ECU 61 controls the electric motor 4 to drive the electric motor 4 at the set rotation speed.

The electric motor 4 which is provided in the hybrid vehicle V (see FIG. 1A) and is an auxiliary driving source of the output of the engine 2 is configured such that the electric motor 4 can be driven at the rotation speed set in advance.

With this configuration, the electric motor 4 can preferably assist the engine 2.

Further, when the engine 2 is started, the electric motor 4 can rotate and crank the crank shaft (not shown) to start the engine 2 as a cell motor.

When starting the engine 2, it is preferable that the rotation speed of the electric motor 4 is controlled by the engine ECU 61 (see FIG. 2) so that the electric motor 4 is driven at the rotation speed set in advance to start the engine 2.

The front ACM 10a and the rear ACM 10b that constitute the active vibration damping support device 1 are mounted on a position lower than the height of the gravity center of the engine 2. The front ACM 10a and the rear ACM 10b have functions of absorbing the roll vibration generated in the front-rear direction in the engine 2 and elastically supporting the engine 2 in the vehicle body of the hybrid vehicle V.

As shown in FIG. 1B, the active vibration damping support device 1 has functions of elastically supporting the engine 2 in the hybrid vehicle V and moving the front part or the rear part of the engine 2 in an up-down direction. Thus, the active vibration damping support device 1 has a structure shown in FIGS. 2 and 3.

Figure 2:
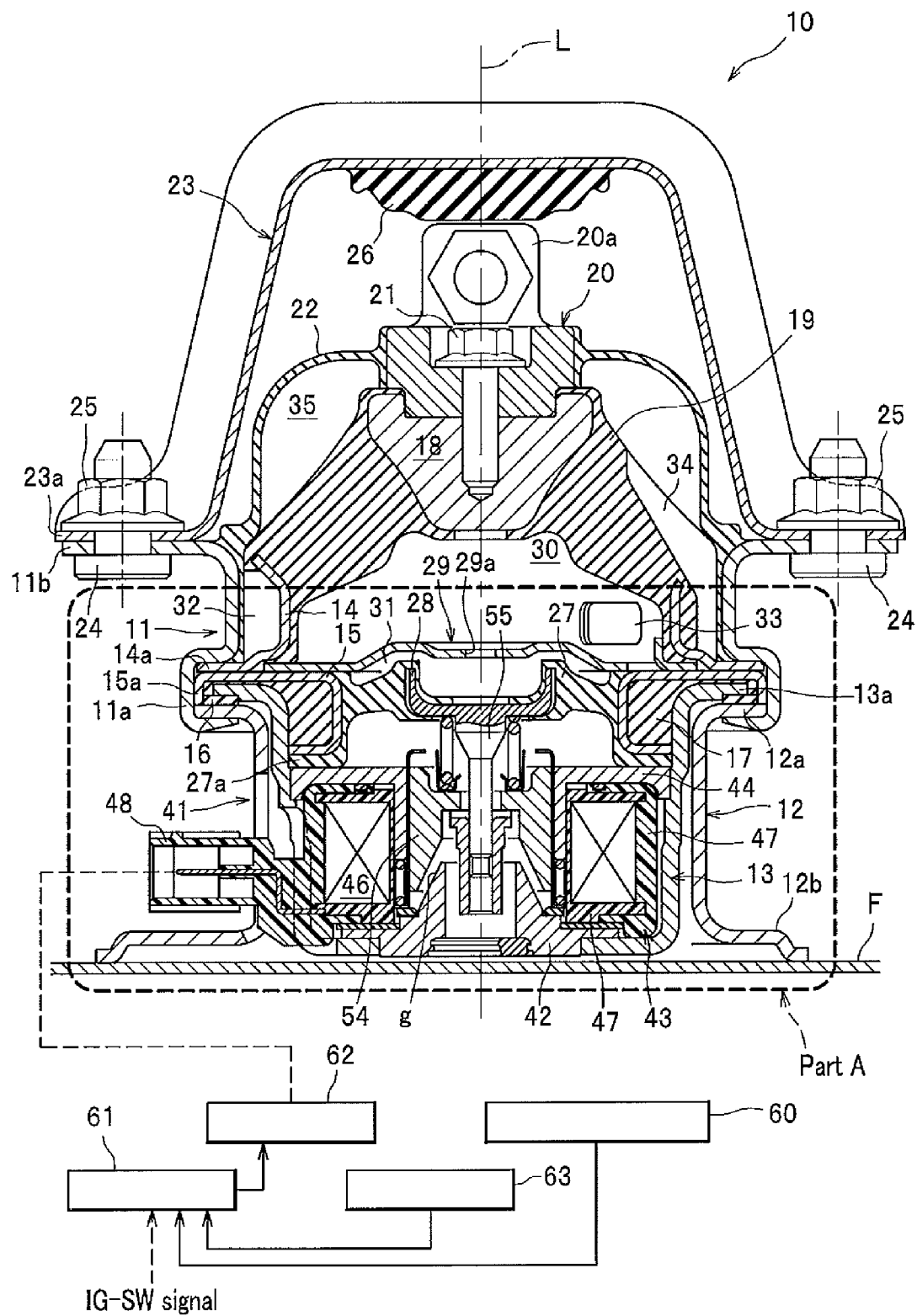
FIG. 2 is a cross sectional view showing a structure of the active vibration damping support device.

As shown in FIG. 2, the active vibration damping support device 1 (see FIG. 1A) includes an active control mount ECU (Electronic Control Unit, hereinafter referred to as an ACMECU) 62 which controls the ACMs 10. The ACMECU 62 is connected with a communication line to the engine ECU 61 that controls the engine rotation speed and the output torque of the engine 2 (see FIG. 1B).

Input to the ACMECU 62 from the engine ECU 61 are an NE signal indicating the engine rotation speed, a CP signal indicating a crank pulse detected by the crank pulse sensor 60, a TDC (Top Dead Center) pulse signal indicating the top dead center of each cylinder, a SO (cylinder off) signal indicating whether the V-six engine 2 is in an all-cylinder operation state or a selective cylinder operation state, an IF-SW signal indicating the operation state (the turning ON of the ignition switch) of the ignition switch (not shown), and an accelerator position sensor signal indicating the opening degree of an accelerator.

In a case of the V-six engine, the crank pulse is output 24 times per one rotation of the crank shaft (i.e. one time every 15 degrees of the crank angle).

<Configuration of ACM>

As shown in FIG. 2, the ACM 10 has a structure that is substantially symmetrical with respect to an axis $L_4$, and includes a substantially cylindrical upper housing 11, a substantially cylindrical lower housing 12 disposed below the housing 11, an upwardly opening substantially cup-shaped actuator case 13 housed in the lower housing 12, a diaphragm 22 connected on the upper housing 11, an annular first elastic body support ring 14 housed in the upper housing 11, a first elastic body 19 connected on the first elastic body support ring 14, an annular second elastic body support ring 15 housed in the actuator case 13, a second elastic body 27 connected to an inner peripheral side of the second elastic body support ring 15, and a driving unit (actuator) 41 housed in the actuator case 13 and disposed below the second elastic body support ring 15 and the second elastic body 27.

Between a flange unit 11a at the lower end of the upper housing 11 and a flange unit 12a at the upper end of the lower housing 12, a flange unit 13a on the outer periphery of the actuator case 13, an outer peripheral unit 14a of the first elastic body support ring 14, and an upper and outer peripheral unit 15a of a second elastic body support ring 15 which is disposed in an upper part of the actuator case 13 and has a substantially transverse U shape in an annular cross-section with upper and lower outer peripheral portions are superimposed and joined by crimping. In this process, an annular first floating rubber 16 is disposed between the flange unit 12a and the flange unit 13a, and an annular second floating rubber 17 is disposed between an upper side of the flange unit 13a and lower side of the upper and outer peripheral unit 15a, so that the actuator case 13 is floatingly supported such that it can move up and down relative to the upper housing 11 and the lower housing 12.

The first elastic body support ring 14, and a first elastic body support boss 18 disposed in a concave unit provided on the upper side of a first elastic body 19 are joined by vulcanization bonding at the lower and upper ends of the first elastic body 19 made of a thick rubber. Further, a diaphragm support boss 20 is fixed to an upper face of the first elastic body support boss 18 by a bolt 21. An outer peripheral unit of a diaphragm 22 whose inner peripheral unit is joined by vulcanization bonding to the diaphragm support boss 20, is joined by vulcanization bonding to the upper housing 11.

An engine mounting unit 20a integrally formed with an upper face of the diaphragm support boss 20 is fixed to the engine 2 (see FIG. 1A). (Detailed method for fixing is not shown). Also, a vehicle body mounting unit 12b at the lower end of the lower housing 12 is fixed to the vehicle body frame F (not shown).

A flange unit 23a at the lower end of a stopper member 23 is joined to a flange unit 11b by bolts 24 and nuts 25 at the upper end of the upper housing 11. The engine mounting unit 20a provided on the diaphragm support boss 20 faces a stopper rubber 26 attached to an upper inner face of the stopper member 23 so that the engine mounting unit 20a can touch the stopper rubber 26.

By such a structure, when a large load is input from the engine 2 (see FIG. 1A) to the ACM 10, the engine mounting unit 20a touches the stopper rubber 26, thereby reducing excessive displacement of the engine 2.

An outer peripheral unit of a second elastic body 27 made of a membranous rubber is joined to the inner peripheral face of the second elastic body support ring 15 by vulcanization bonding. At a center portion of the second elastic body 27, a movable member 28 is joined by vulcanization bonding so that the upper unit thereof is embedded in.

A disc-shaped partition member 29 is fixed between an upper face of the second elastic body support ring 15 and the lower unit of the first elastic body support ring 14. A first liquid chamber 30 defined by the first elastic body support ring 14, the first elastic body 19 and the partition member 29, and a second liquid chamber 31 defined by the partition member 29 and the second elastic body 27, communicate with each other via a through hole 29a formed in the center of the partition member 29.

The outer peripheral unit 27a of the second elastic body 27 is held between a lower and outer peripheral unit 15b of the second elastic body support ring 15 (see FIG. 3) and a yoke 44 described below to function as a seal.

Also, an annular through passage 32 is formed between the first elastic body support ring 14 and the upper housing 11. The through passage 32 communicates with the first liquid chamber 30 via a through hole 33, and communicates via a through gap 34 with a third liquid chamber 35 defined by the first elastic body 19 and the diaphragm 22.

Next, a detailed structure of the driving unit 41 stored in the actuator case 13 and shown inside of the broken line is described with reference to FIG. 3.

Figure 3:
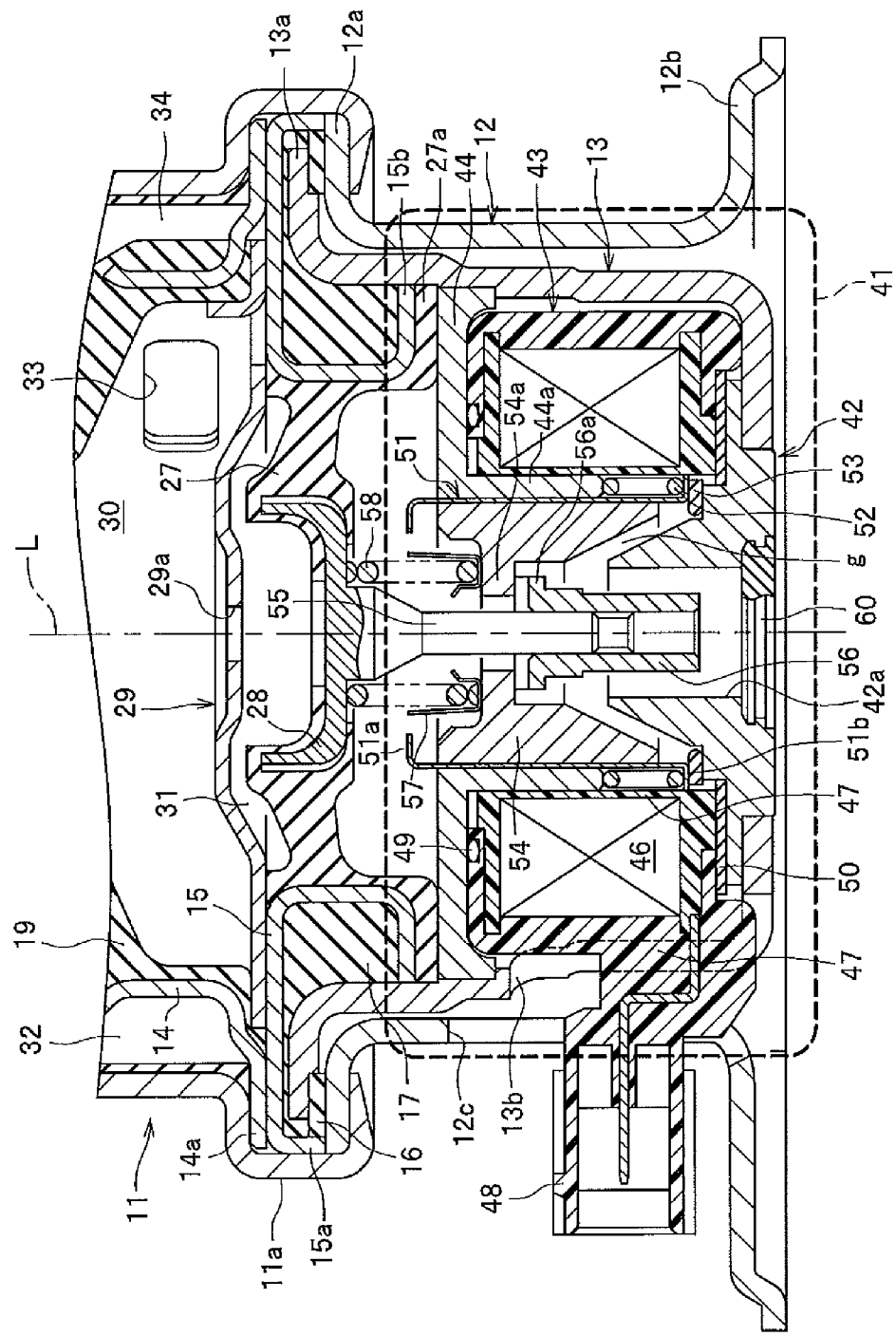
FIG. 3 is an enlarged view of the part A shown in FIG. 2.

As shown in FIG. 3, the driving unit 41 is comprised of a stationary core 42 made of metal or alloy which has high magnetic permeability, a coil assembly 43, a yoke 44, and a movable core 54, etc.

The stationary core 42 is a substantially cylindrical shape including, at a lower end thereof, a flange part which is a seating face. The outer periphery of a cylindrical part is the peripheral shape of a circular cone. The movable core 54 has a substantially cylindrical shape, and the movable core 54 protrudes in the inner circumferential direction so as to form a spring seat 54a. The inner circumference of a cylindrical part which is lower than the spring seat 54a has the peripheral shape of a circular cone.

The coil assembly 43 includes a cylindrical coil 46 disposed between the stationary core 42 and the yoke 44, and a coil cover 47 covering the outer periphery of the coil 46. The coil cover 47 is integrally formed with a connector 48 running through openings 13b and 12c formed in the actuator case 13 and the lower housing 12 and extending outward, and an electric supply line is connected to the connector 48 to supply electric power to the coil 46.

The yoke 44 has an annular flange on the upper side of the coil cover 47, and has a cylindrical unit 44a extending downward from the inner peripheral unit of the flange. The yoke 44 has, as it were, a configuration of cylinder having flange. A seal 49 is disposed between an upper face of the coil cover 47 and a lower face of the annular flange of the yoke 44. A seal 50 is disposed between a lower face of the coil cover 47 and an upper face of the stationary core 42. These seals 49 and 50 can prevent water or dust from entering an internal space of the driving unit 41 via the openings 13b and 12c formed in the actuator case 13 and the lower housing 12.

A thin cylindrical bearing member 51 is fitted, in a vertically slidable manner, into an inner peripheral face of a cylindrical unit 44a of the yoke 44. An upper flange 51a and a lower flange 51b are formed at the upper end and the lower end respectively of the bearing member 51, the upper flange 51a being bent radially inward, the lower flange 51b being bent radially outward.

A set spring 52 is disposed in a compressed state between the lower flange 51b and the lower end of the cylindrical unit 44a of the yoke 44. The bearing member 51 is supported by the yoke 44 by the lower flange 51b being pressed against the upper face of the stationary core 42 via an elastic body 53 disposed between the lower face of the lower flange 51b and the stationary core 42 by means of an elastic force of the set spring 52.

A substantially cylindrical movable core 54 is fitted, in a vertically slidable manner, into an inner peripheral face of the bearing member 51. Further, the stationary core 42 and the movable core 54 have hollow center portions on the axis L respectively, and a substantially cylindrical rod 55, which connects to the center of the movable member 28 (on the axis L) and extends downwardly, is inserted there. A nut 56 is tightened around the lower end of the rod 55. The nut 56 has a hollow part at its center, the upper end of the hollow part opens upward, and receives the lower end of the rod 55 in the hollow part. An upper end 56a of the nut 56 has a slightly larger outer diameter than that of its lower portion. An upper face of the upper end 56a touches the lower face of the spring washer 54a.

Also, a set spring 58 is disposed in a compressed state between the spring washer 54a of the movable core 54 and a lower face of the movable member 28. The lower face of the spring washer 54a of the movable core 54 is fixed by being pressed against the upper end 56a of the nut 56 by means of an elastic force of the set spring 58. In this state, the conical inner peripheral unit of the cylindrical unit of the movable core 54 and the conical outer peripheral unit of the stationary core 42 face each other across a conical air gap g.

Relative to the rod 55, the nut 56 is tightened in an opening 42*a* formed in the center of the stationary core 42 with position adjustment in vertical direction. This opening 42*a* is blocked by a rubber cup 60.

The operation of the ACM 10 which is configured as described above is explained below (see FIGS. 1 to 3 as appropriate).

As shown in FIG. 2, a crank pulse sensor 60 and a cam angle sensor 63 are connected to the engine ECU 61. The crank pulse sensor 60 outputs a CP signal indicating a crank pulse which is output 24 times per one rotation of the crank shaft (not shown) of the engine 2 (see FIG. 1A) (i.e. once every 15 degrees of the crank angle).

The cam angle sensor 63 outputs a TDC pulse signal indicating the timing of the top dead center three times per one rotation of the crank shaft (i.e. once every time the top dead center is reached in each cylinder).

Further, the ACM ECU 62 is connected to the engine ECU 61, and the CP signal and the TDC pulse signal are input to the ACM ECU 62 from the engine ECU 61.

The ACM ECU 62 estimates the vibration status of the engine 2 based on the CP signal and the TDC pulse signal which are input to the ACM ECU 62 from the engine ECU 61 and controls the electricity to be supplied to the driving unit 41 of the two ACMs 10 (the front ACM 10*a* and the rear ACM 10*b*) that comprises the active vibration damping support device 1

A coil 46 of the driving unit 41 shown in FIG. 3 is excited by electric power (excitation current) supplied from the ACM_ECU 62 so as to move a movable core 54 by sucking force to move a movable member 28 downward. Associated with movement of this movable member 28, a second elastic body 27 which defines a second liquid chamber 31 is downwardly deformed so as to increase the capacity of the second liquid chamber 31. Conversely, when the coil 46 is demagnetized, the movable member 28 and the movable core 54 move upward by the elasticity of the second elastic body 27, and the capacity of the second liquid chamber 31 decreases.

A low frequency engine shake vibration (e.g., 7-20 Hz) is caused by a resonance between the vehicle body and the engine system in a coupled system including the engine 2, the vehicle body, and a suspension. When the low frequency engine shake vibration occurs while the hybrid vehicle V is traveling, the first elastic body 19 is deformed by a load input from the engine via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. In this state, when the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set such that a low spring constant and high attenuation force are exhibited in the frequency region of the engine shake vibration. Therefore, it is possible to effectively reduce the vibration transmitted from the engine 2 to the vehicle body frame F.

Further, in the frequency region of the engine shake vibration, when the engine 2 is in a steady rotating state, the driving unit 41 is maintained in a non-operating state.

When vibration occurs which has a higher frequency than that of the above-mentioned engine shake vibration, that is, vibration during idling or vibration during selective-cylinder operation due to the rotation of the crankshaft (not shown) of the engine 2, the liquid within the through passage 32 providing communication between the first liquid chamber 30 and the third liquid chamber 35 becomes stationary and a vibration isolating function cannot be exhibited. Therefore, the ACM ECU 62 performs a vibration isolating function by driving the driving units 41, 41 of the front ACM 10*a* and the rear ACM 10*b* to absorb the vibration.

Thus, the ACM ECU 62 which controls the active vibration damping support device 1 including the front ACM 10*a* and the rear ACM 10*b* drives the driving unit 41 by controlling excitation current to be supplied to the coil 46 on the basis of signals input from the crank pulse sensor 60, the cam angle sensor 63, and the engine ECU 61.

For reference's sake, the idle vibration is caused by low-frequency vibrations of a floor, seats, and a steering wheel during idling. For example, BURUBURU vibration is caused in a four-cylinder engine in a range of 20-35 Hz, and in a six-cylinder engine in a range of 30-50 Hz, and YUSAYUSA vibration is caused in a range of 5-10 Hz by uneven combustion, and the main factor of the YUSAYUSA vibration is roll vibration in the engine.

Figure 4:
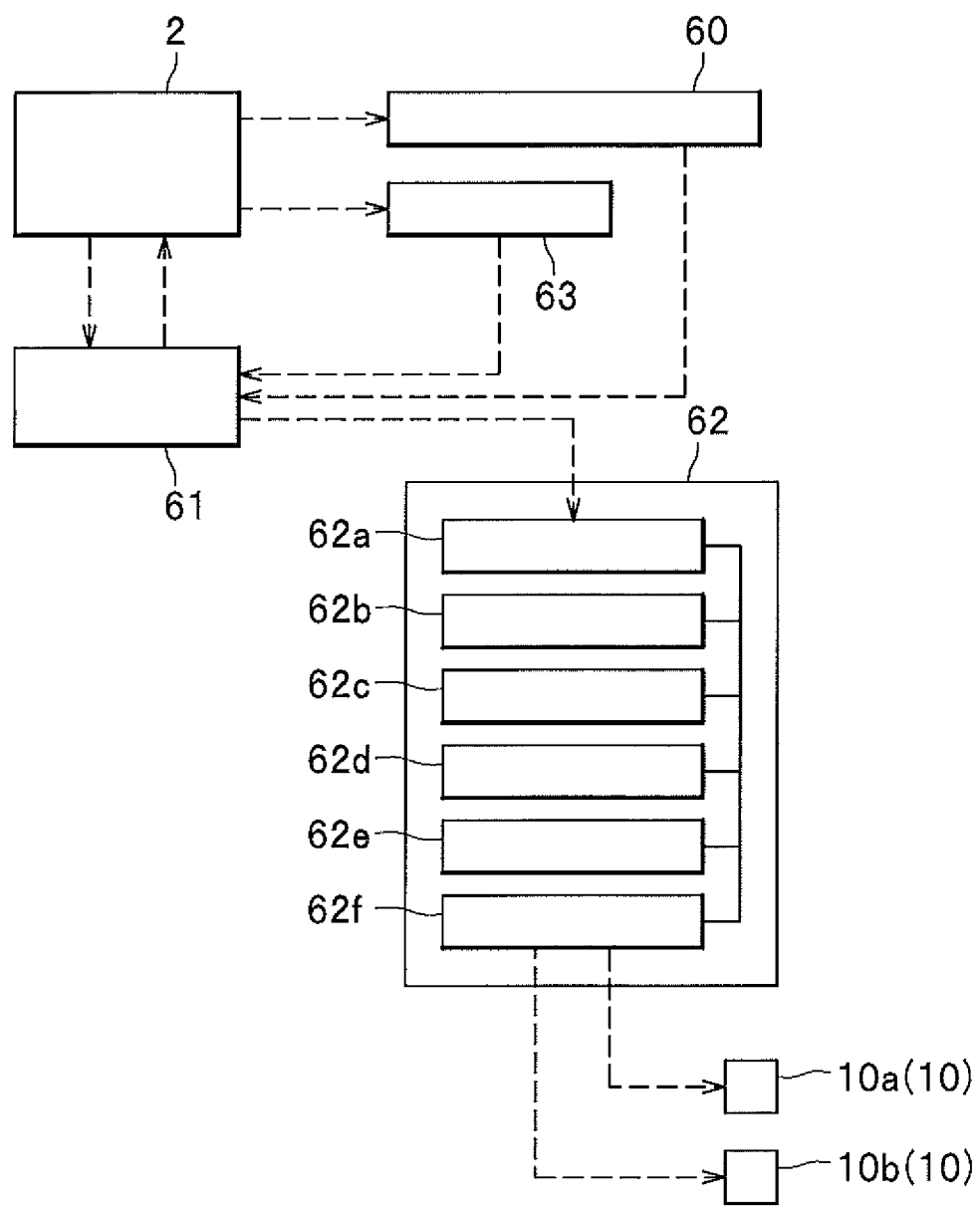
FIG. 4 is a block diagram showing the connection of a crank pulse sensor, a cam angle sensor, an engine ECU and an ACMECU.

As shown in FIG. 4, the engine ECU 61 is comprised of a micro computer including a CPU (Central Processing Unit), ROM (Read Only Memory), RAM (Random Access Memory) and a peripheral circuit or the like and performs functions of controlling the rotation speed of the engine 2 or detecting the rotation speed of the engine 2 via the rotation speed sensor (not shown) provided to the engine 2. Then the engine ECU 61 inputs the detected rotation speed to the ACM ECU 62 as an NE signal. Further, the engine ECU 61 inputs the CP signal input from the crank pulse sensor 60 and the TDC pulse signal input from the cam angle sensor 63 to the ACM ECU 62.

The ACM ECU 62 is comprised of a micro computer including a CPU 62*b*, a ROM 62*c*, a RAM 62*d*, etc. and a peripheral circuit. The ACM ECU 62 also includes a signal input unit 62*a* to which the NE signal, the CP signal and the TDC pulse signal are input from the engine ECU 61.

Further, the ACM ECU 62 includes a power feeding circuit 62*f* which has a switching circuit (not shown) and supplies excitation current to the coils 46 (see FIG. 3) in the front ACM 10*a* and the rear ACM 10*b*, respectively. The switching circuit of the power feeding circuit 62*f* is controlled by the CPU 62*b* such that the power feeding circuit 62*f* can supply a direct current power source provided from a battery (not shown) to the coils 46 through a connector 48 (see FIG. 3). By making the CPU 62*b* execute a program stored, for example, in the ROM 62*c*, the ACM ECU 62 controls the two ACMs 10.

In the driving unit 41 of the ACM 10 configured as shown in FIG. 3, when an excitation current is not supplied to the coil 46, a movable member 28 is upwardly moved by elastic restorative force of a second elastic body 27. Also, a nut member 56 pushes a movable core 54 up to form an air gap g between the movable core 54 and the stationary core 42.

On the other hand, when an excitation current is supplied from the power feeding unit 62*f* of the ACM ECU 62 to the coil 46, the movable core 54 is attracted and moved downward by magnetic flux passing through the air gap g in the up-down direction. At this time, the movable core 54 moves the movable member 28 downward via the nut member 56 fixed to the movable member 28 so as to deform the second elastic body 27 downward. As a result, since the capacity of the second liquid chamber 31 (see FIG. 1) increases, a liquid in the first liquid chamber 30 compressed by load from the engine 2 (see FIG. 1A) flows into the second liquid chamber 31 through the through hole 29a of the partition member 29 to reduce load transmitted from the engine 2 to the hybrid vehicle V (See FIG. 1A).

As described above, the ACM ECU 62 can control the vertical motion of the movable member 28 by controlling ON and OFF of the excitation current supplied to the coil 46. This makes it possible for the ACM 10 to absorb the vibration generated at the engine 2.

Next, the operation of ACMECU 62 will be explained with reference to FIG. 5 (also refer to FIGS. 1-4 as appropriate).

Figure 5:
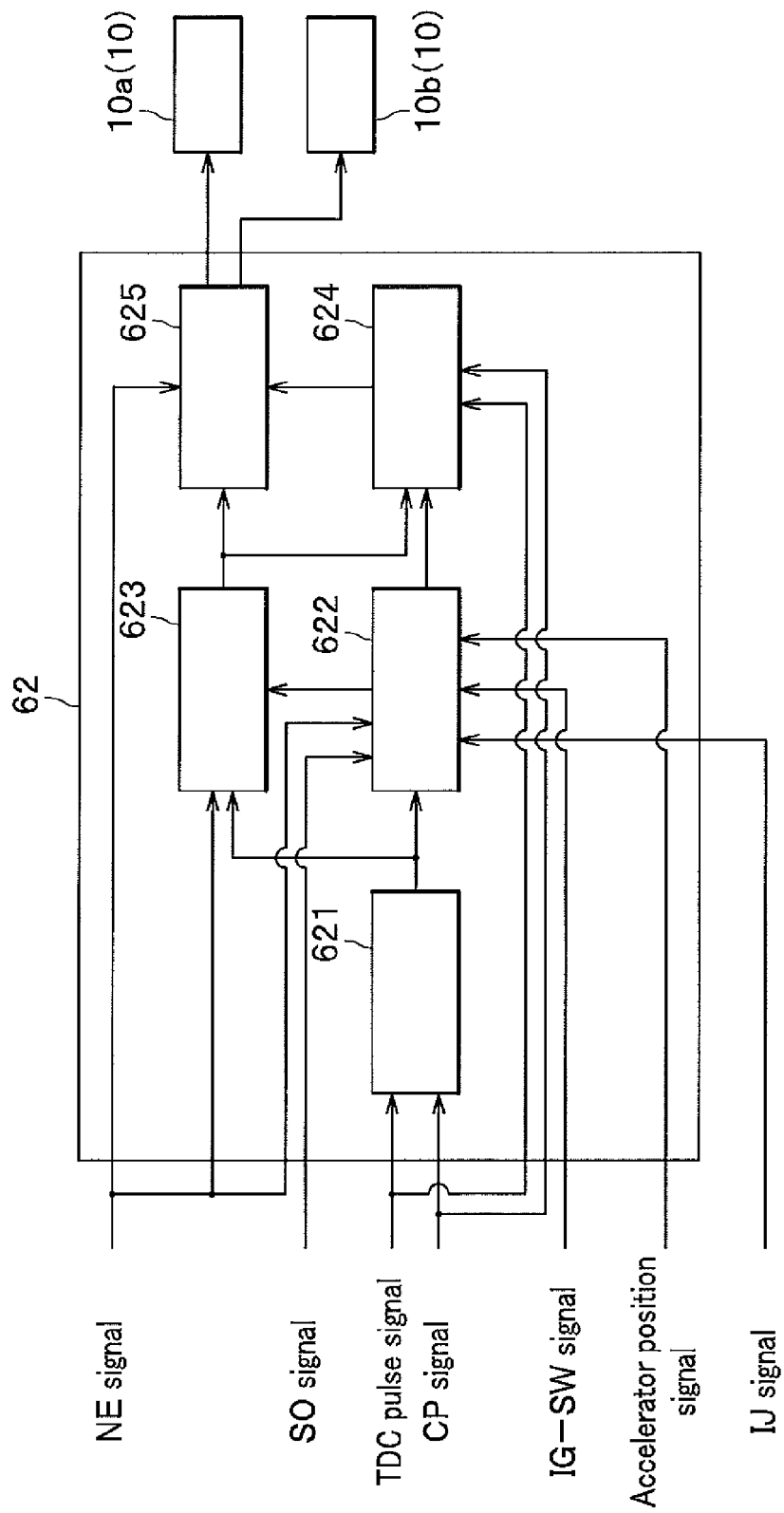
FIG. 5 is a functional block diagram of the ACM ECU according to the embodiment.

As shown in FIG. 5, the ACMECU 62 includes as its functional blocks a crank pulse interval calculation unit 621, an engine rotation mode determination unit 622, a vibration state estimating unit 623, a phase detecting unit 624, and an actuator driving control unit 625.

These functional blocks are realized when the CPU 62b executes programs stored, for example, in the ROM 62c.

The crank pulse interval calculation unit 621 calculates an interval of the crank pulse based on an internal clock signal of the CPU 62b, a crank pulse signal and a TDC pulse signal input from the engine ECU 61.

The crank pulse interval calculated by the crank pulse interval calculation unit 621 is sent to the engine rotation mode determination unit 622 and the vibration state estimating unit 623.

The NE signal, the CO signal, the IG-SW signal, the accelerator position sensor signal, and the IJ signal are input from the engine ECU 61 to the engine rotation mode determination unit 622. The engine rotation mode determination unit 622 determines the rotation mode of the engine 2 based on these signals.

For example, if the engine rotation speed is increased when the IJ signal is not input, the engine rotation mode determination unit 622 determines that the engine rotation mode is a motoring mode where the engine 2 is driven by the electrical motor 4.

The engine rotation mode determination unit 622 also includes functions of determining whether the engine 102 is in an all-cylinder operation state or a selective cylinder operation state based on the SO signal and determining an idling state based on the accelerator position sensor signal.

The vibration state estimating unit 623 calculates the rotational fluctuation of the crank shaft based on the crank pulse interval calculated by the crank pulse interval calculation unit 621 when the engine 2 is driven in any of the following driving modes: the idling mode, the all-cylinder operation state or the selective cylinder operation state. Further, the vibration state estimating unit 623 calculates the magnitude and the cycle of the engine vibration based on the P-P value (the interval between a peak to the next peak) of the calculated rotational fluctuation of the crank shaft. Provided that the magnitude of the engine vibration and the cycle of the engine vibration are included in and referred to as a vibration state in this specification, the vibration state estimating unit 623 can be understood as having a function for estimating the vibration state.

The vibration state estimating unit 623 outputs the estimated vibration state (the magnitude and cycle of the engine vibration) and the peak to peak timing of the rotational fluctuation of the crank shaft, etc. to the phase detecting unit 624 and the actuator driving control unit 625.

The vibration state estimating unit 623 estimates the vibration state based on the rotational mode of the engine 2 which is determined by the engine rotation mode determination unit 622, and outputs the vibration state.

For example, when the engine 2 is a V-type six-cylinder engine, the vibration state estimating unit 623 estimates that the vibration is the third order engine vibration in the case of all-cylinder operation state, and estimates that the vibration is 1.5th order engine vibration in the case of selective cylinder operation state.

Since the method for estimating this vibration state is disclosed in, for example, "111 Development of active engine mount", JSAE Annual Congress (Autumn), Sep. 18, 2003, detailed description will be omitted.

The vibration state estimating unit 623 also includes a function of determining that the roll vibration is generated in the engine 2 when the engine rotation speed calculated based on the NE signal reaches the roll vibration rotation speed.

When the engine 2 is in the idling state, all-cylinder operation state, or selective cylinder operation state, the phase detector 624 compares the timing of the peak of the rotation fluctuation of the crankshaft and the timing of TDC based on the peak-to-peak value of the rotation fluctuation of the crankshaft calculated by the vibration state estimating unit 623, the CP signal output from the engine ECU 73 and the TDC pulse signal for each cylinder and detects the phase of the vibration generated in the engine 2. The vibration state estimating unit 623 then outputs the detected phase to the actuator driving control unit 625.

The actuator driving control unit 625 calculates the waveform of the excitation current which can realize a mount operation that absorbs the vibration of the engine 2 based on the phase detected by the phase detecting unit 624 and the engine rotation speed. The actuator driving control unit 625 then supplies the excitation current of the calculated waveform to the driving units 41 of the front ACM 10a and the rear ACM 10b to expand or contract (control) the two ACMs 10.

The engine ECU 61 shown in FIG. 4 calculates the engine rotation speed and inputs the calculated engine rotation speed to the ACM ECU 62 as the NE signal based on the CP signal input from the crank pulse sensor 60 and the TDC pulse signal, etc.

The ACM ECU 62 which is configured as shown in FIG. 5 calculates the magnitude and cycle of the vibration generated in the engine 2 and the timing of the peaks of the rotation fluctuation of the crankshaft as described above and controls the two ACMs 10 such that the two ACMs 10 absorb the vibration of the engine 2.

With this configuration, the active vibration damping support device 1 can absorb the vibration generated in the engine 2 and suppress the transmission of the vibration to the vehicle body frame F.

Conventionally, in the ACM ECU 62 shown in FIG. 4 the vibration state estimating unit 623 (see FIG. 5) predicts that the roll vibration will be generated in the engine 2 and starts to control the two ACMs 10 when the engine rotation speed calculated based on the NE signal input from the engine ECU 61 reaches the roll vibration rotation speed at the start time of the engine 2.

Figure 6:
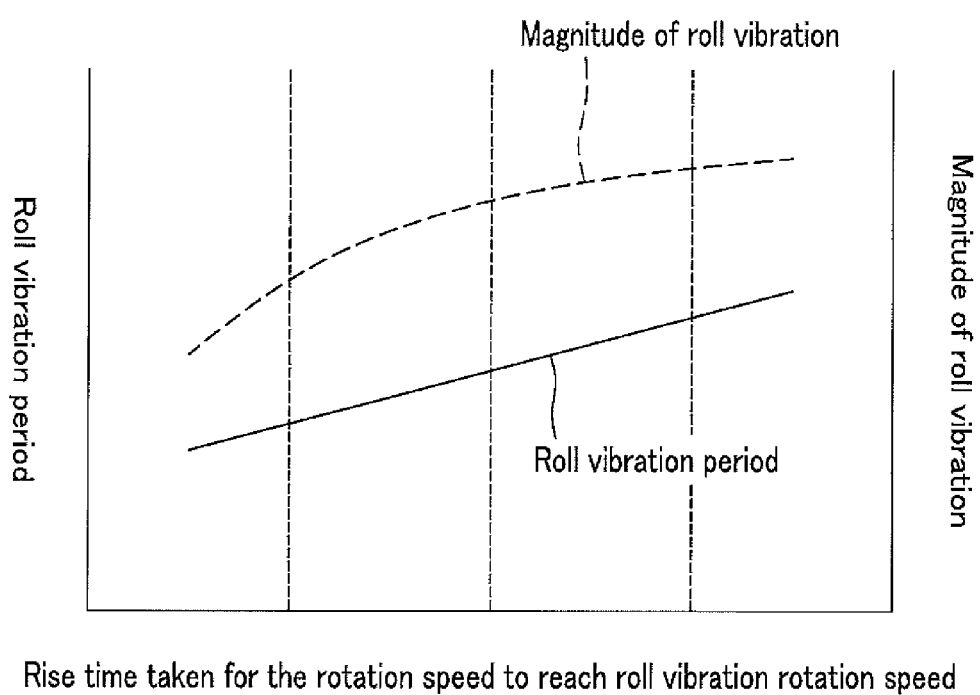
FIG. 6 is a graph showing relationships among a rise time in which the engine rotation speed reaches roll vibration rotation speed when the engine is started, the magnitude of the roll vibration, and the roll vibration continuation period.

For example, when the engine 2(see FIG. 1A) is started, correlations such as the those shown in FIG. 6 have been known among a rise time in which the engine rotation speed reaches the roll vibration rotation speed (the rise time of the engine 2), the amplitude (magnitude) of the roll vibration and the time period in which the roll vibration continues (a roll vibration period).

Hereinafter, the magnitude and cycle of the roll vibration and the roll vibration period are collectively referred to as the vibration status of the roll vibration.

As shown in FIG. 6, the shorter the time period taken for the engine rotation speed to reach the roll vibration rotation speed is and the more rapid the engine rotation speed is increased, the smaller the magnitude of the roll vibration generated in the engine 2 (see FIG. 1A) is and the shorter the roll vibration period is. This means that the shorter the rise time of the engine 2 is, the smaller the magnitude of the roll vibration of the engine 2 is and the shorter the roll vibration period is.

Therefore, if the rise time taken for the engine rotation speed to reach the roll vibration rotation speed from 0 is known, the vibration state estimating unit 623 (see FIG. 5) in the ACM ECU 62 can predict the magnitude of the roll vibration generated in the engine 2 (see FIG. 1A) and the roll vibration period by referring to the graph shown in FIG. 6. In short, the vibration state estimating unit 623 has a functions as a prediction unit for predicting the vibration status of the roll vibration.

Therefore, it is preferable to configure that the graph shown in FIG. 6 is stored, for example, in the ROM 62c (see FIG. 4) of the ACM ECU 62 as a map, for example.

The vibration state estimating unit 623 (see FIG. 5) of the ACM ECU 62 can predict the magnitude of the roll vibration generated in the engine 2 (see FIG. 1A) and the roll vibration period by referring to the map stored in the ROM 62c based on the rise time of the engine 2 in which the engine rotation speed reaches the roll vibration rotation speed from 0.

For example, the vibration state estimating unit 623 (see FIG. 5) of the ACM ECU 62 measures the time taken for the engine rotation speed to reach the roll vibration rotation speed since an ignition switch (not shown) is turned ON to calculate the rise time of the engine 2. Thus, the vibration state estimating unit 623 can predict the magnitude of the roll vibration and the roll vibration period with reference to the map stored in the ROM 62c (see FIG. 4) based on the calculated rise time of the engine 2.

Then, after the vibration state estimating unit 623 shown in FIG. 5 calculates the cycle of the roll vibration, the vibration state estimating unit 623 inputs the vibration status of the predicted roll vibration (the magnitude and the cycle of the roll vibration and the roll vibration period) to the actuator driving control unit 625 and the phase detecting unit 624.

The phase detecting unit 624 shown in FIG. 5 compares the timing of the peak of the rotation fluctuation of the crankshaft and the timing of the top dead center of each cylinder to detect the phase of the roll vibration based on the input vibration status of the roll vibration. The detected phase is output to the actuator driving control unit 625.

The actuator driving control unit 625 shown in FIG. 5 calculates the waveform of the excitation current which can realize an mount operation that absorbs the vibration of the engine 2 (see FIG. 1A) based on the phase detected by the phase detecting unit 624 and the engine rotation speed. The actuator driving control unit 625 then supplies the excitation current of the calculated waveform to the respective driving unit 41 of the front ACM 10a (see FIG. 1A) and the rear ACM 10b (see FIG. 1A) to expand or contract the two ACMs 10.

The actuator driving control unit 625 controls the two ACMs 10 as described above during the roll vibration period predicted by the vibration state estimating unit 623 so that the two ACMs 10 absorb the roll vibration generated at the start time of the engine 2.

At the time when the engine 2 (see FIG. 1A) is started, however, the engine rotation speed is varied irregularly. Thus, the magnitude of the roll vibration or the roll vibration period predicted by the vibration state estimating unit 623 (see FIG. 5) of the ACM ECU 62 based on the engine rotation speed calculated by the engine ECU 61 (see FIG. 4) from the CP signal and the TDC pulse signal may not be accurately same as the vibration status of the roll vibration actually generated in the engine 2.

In view of the above problem, the hybrid vehicle V (see FIG. 1A) according to the embodiment is configured to start the engine 2 (see FIG. 1A) by the electrical motor 4 (see FIG. 1A) which is an auxiliary driving source of an engine output.

The hybrid vehicle V (see FIG. 1A) according to the embodiment is characterized in that the rotation speed of the electrical motor 4 is controlled such that the engine rotation speed reaches the roll vibration rotation speed in a predetermined time period at the start time of the engine 2.

Generally, a motor used for a cell motor (not shown) for starting the engine 2 (see FIG. 1A) has a small output torque, and thus the motor can not accurately control the rotation speed of the crankshaft (not shown) of the engine 2 although it can rotate the crankshaft.

Therefore, the engine rotation speed is varied irregularly at the time when the engine 2 is started.

On the other hand, a motor whose output torque is large is used for the electrical motor 4 (see FIG. 1A) of the hybrid vehicle V so that the motor can be an auxiliary driving source of the engine output.

Further, the electrical motor 4 provided to the hybrid vehicle V can control the rotation speed, as described above. In other words, the rotation speed can be set in advance.

Therefore, the electrical motor 4 can precisely control the rotation speed of the crankshaft (not shown) of the engine 2 (see FIG. 1A) (i.e. engine rotation speed) at the engine start time. For example, the time taken for the engine 2 to reach a predetermined rotation speed can be set in advance.

With this configuration, the ACM ECU 62 (see FIG. 4) can precisely grasp the rise time in which the engine rotation speed reaches the roll vibration rotation speed at the start time of the engine 2 (see FIG. 1A) of the hybrid vehicle V.

For example, when an ignition switch (not shown) is turned ON at the time t0, the electrical motor 4 (see FIG. 1A) is started to be driven, and the engine rotation speed starts to increase from 0 rpm as shown in FIG. 7.

When the engine rotation speed is increased by driving the electrical motor 4 and reaches the roll vibration rotation speed Ne1 at the time t1, the roll vibration is generated in the engine 2 (see FIG. 1A).

If the electrical motor 4 which is the auxiliary driving source of the output of the engine 2 (see FIG. 1A) is used at the start time of the engine 2 (see FIG. 1A) of the hybrid vehicle V, a rise time period ΔT1 (time t0→t1) in which the engine rotation speed reaches the roll vibration rotation speed Ne1 since the electrical motor 4 is started by turning on the ignition switch is determined by the rotation speed of the electrical motor 4.

That is, if the rotation speed of the electrical motor 4 is set in advance, the rise time period ΔT1 in which the engine rotation speed reaches the roll vibration rotation speed Ne1 becomes always constant.

In the embodiment, the rise time period ΔT1 corresponds to a predetermined time period recited in Claims.

For example, the rise time period ΔT1 in which the engine rotation speed reaches the roll vibration rotation speed Ne1 since the ignition switch (not shown) is turned on is set in advance and the rotation speed of the electrical motor 4 (see FIG. 1A) is set to realize the rise time period ΔT1.

If the rise time period ΔT1 is stored, for example, in the ROM 62c (see FIG. 4), the vibration state estimating unit 623 (see FIG. 5) of the ACM ECU 62 can grasp the rise time period ΔT1 precisely.

If the rise time period ΔT1 in which the engine rotation speed reaches the roll vibration rotation speed Ne1 is always constant, the magnitude of the roll vibration and the roll vibration period derived from the graph shown in FIG. 6 are always constant.

Since the engine 2 (see FIG. 1A) is driven and rotated by the electrical motor 4 (see FIG. 1A) whose output torque is large at the start time of the engine 2, the rotation fluctuation of the crankshaft (not shown) become always the same every time the engine 2 is started.

Therefore, it is anticipated that the cycle of the vibration (the cycle Tr of the roll vibration) of the engine 2 calculated from the rotation fluctuation of the crankshaft will be the same every time the engine 2 is started.

Specifically, the vibration status of the roll vibration including the magnitude of the roll vibration Xr, the cycle Tr and the roll vibration period ΔT2 can be set in advance which correspond to the rise time period ΔT1 which is set in advance. The ACM ECU 62 (see FIG. 4) can control the two ACMs 10 (see FIG. 1A) based on the vibration status of the roll vibration which is set in advance.

In other words, the ACM ECU 62 can accurately predict the vibration status of the roll vibration generated in the engine 2 and control the two ACMs 10.

For example, the ACM ECU 62 (see FIG. 4) does not need to obtain the magnitude of the roll vibration Xr and the roll vibration period ΔT2 which correspond to the rise time period ΔT1 in which the engine rotation speed reaches the roll vibration rotation speed Ne1 with reference to FIG. 6 and does not need calculate the cycle Tr of the roll vibration. Therefore, it is possible to improve the calculation speed of the ACM ECU 62 when the ACM ECU 62 controls the two ACMs 10 (see FIG. 1A) at the start time of the engine 2 and to start the control of the two ACMs 10 immediately when the roll vibration is generated in the engine 2.

As the ACM ECU 62 (see FIG. 4) controls the two ACMs 10 (see FIG. 4) based on the vibration status of the roll vibration which has been set in advance, the ACM ECU 62 just controls the two ACMs 10 in the same manner every time the engine 2 (see FIG. 4) is started.

For example, if the vibration status (the magnitude of the roll vibration Xr, the cycle Tr and the roll vibration period ΔT2) of the roll vibration at the start time of the engine 2 is determined, the operation of the two ACMs 10 that can most effectively absorb the roll vibration generated in the engine 2 can be set by an experiment or the like.

By making the ACM ECU 62 to control the two ACMs 10 so as to realize the operation of the two ACMs 10 set as describe above, the roll vibration generated in the engine 2 can be preferably absorbed by the two ACMs 10, whereby the transmission of the roll vibration to the vehicle body frame F (see FIG. 2) can be suppressed.

Further, as the roll vibration is generated in the engine 2 (see FIG. 4) when the engine rotation speed reaches the roll vibration rotation speed Ne1, the ACM ECU 62 (see FIG. 4) can precisely grasp the time taken for the roll vibration to be generated in the engine 2 since the ignition switch (not shown) is turned on.

The ACM ECU 62 can start to control the two ACMs 10 (see FIG. 4) at the time t1 when the engine rotation speed reaches the roll vibration rotation speed Ne1. In short, the ACM ECU 62 can start to control the two ACMs 10 at the timing in which the roll vibration is generated in the engine 2. Therefore, the roll vibration generated in the engine 2 can be preferably absorbed, and thus the transmission of the roll vibration to the vehicle body frame F (see FIG. 2) can be suppressed.

For example, a series of the operation of the two ACMs 10 (see FIG. 1A) from the time t0 when the ignition switch (not shown) is turned on to the time t2 when the roll vibration period ΔT2 is finished via the time t1 when the engine rotation speed reaches the roll vibration rotation speed Ne1 can be set in advance by an experiment or the like.

It is preferable that the series of the operation of the two ACMs 10 are operations that can preferably absorb the roll vibration generated in the engine 2 (see FIG. 1A).

Programs executed by the ACM ECU 62 are configured such that the series of the operation of the two ACMs 10 (see FIG. 1A) set as described above is realized by the control of the ACMECU62 (see FIG. 4).

By making the ACM ECU 62 to execute the programs configured as described above at the start time of the engine 2 (see FIG. 1A), the roll vibration generated at the start time of the engine 2 can be always absorbed preferably by the two ACMs 10.

As shown in FIG. 7, the ACM ECU 62 (see FIG. 4) may receive a signal notifying the start of the electrical motor 4 (start signal) at a time t3 which is delayed by a delay time period ΔT3 from the time t0 when the ignition switch (not shown) is turned on to start the electrical motor 4 (see FIG. 1A).

In this case, a time period ΔT4 from the time t3 when the ACM ECU 62 receives the start signal to the time t1 when the control of the two ACMs 10 (see FIG. 1A) is started may be a time period which is obtained by deducing from the rise time period ΔT1 the delay time period ΔT3 which is from the time t0 when the electrical motor 4 is started to the time t3 when the ACM ECU 62 receives the start signal.

It may be configured that the control of the two ACMs 10 (see FIG. 1A) is started when the time period ΔT4 has passed since the time when the ACM ECU 62 (see FIG. 4) received the start signal.

By configuring as above, the ACM ECU 62 can start to control the two ACMs 10 at the time t1 when the roll vibration is generated in the engine 2 (see FIG. 1A).

The start signal is, for example, a signal notifying that the engine ECU 61 (see FIG. 4) starts to drive the electrical motor 4 (see FIG. 1A). It may be configured that the start signal is transmitted to the ACM ECU 62 (see FIG. 4) through a communication line (not shown).

In this configuration, the delay time period ΔT3 may be generated as a time period required for the communication.

The delay time period ΔT3, however, can be calculated by an experiment in advance, and programs for realizing the operation of the two ACMs 10 (see FIG. 1A) from the time t0 when the ignition switch (not shown) is turned on to the time t2 when the roll vibration time period ΔT2 has been finished can be configured taking the delay time period ΔT3 into consideration.

More specifically, the time period ΔT4 is set which is calculated by deducing the delay time period ΔT3 obtained by an experiment or the like in advance from the rise time ΔT1 set in advance.

Programs can be configured such that the ACM ECU 62 (see FIG. 4) starts to control the two ACMs 10 (see FIG. 1A) when the time period ΔT4 has passed since the ACM ECU 62 received the start signal.

By making the ACM ECU 62 (see FIG. 4) to execute the programs configured as described above, it is possible to start the control of the two ACMs 10 (see FIG. 1A) at the time t1 when the roll vibration starts. This enables to preferably absorb the roll vibration generated in the engine 2 (see FIG. 1A).

Furthermore, if the hybrid vehicle V (see FIG. 1A) has an idle reduction function, the active vibration damping support device 1 according to the embodiment can absorb with the two ACMs 10 (see FIG. 1A) the roll vibration generated when the engine 2 (see FIG. 1A) is restarted which has been stopped by the idle reduction function, whereby the transmission of the roll vibration to the vehicle body frame F (see FIG. 2) can be suppressed.

In this case, for example, it is configured that the engine ECU 61 (see FIG. 4) inputs to the ACM ECU 62 (see FIG. 4) a signal (a restart signal) which is for starting the electrical motor 4 (see FIG. 1A) to restart the engine 2 (see FIG. 1A).

By making the ACM ECU 62 to control the two ACMs 10 (see FIG. 1A), taking the time when the restart signal is input as the time t3 shown in FIG. 7, the roll vibration generated at the restart time of the engine 2 can be absorbed in the two ACMs 10.

As described above, in the active vibration damping support device 1 (see FIG. 1A) according to the embodiment, the ACM ECU 62 (see FIG. 4) can accurately predict the time taken until the roll vibration comes to an end since the time when the engine 2 (see FIG. 1A) is started, the magnitude of the roll vibration and the cycle of the roll vibration. As the ACM ECU 62 controls the two ACMs 10 based on the magnitude of the roll vibration Xr, the roll vibration period ΔT2 and the cycle Tr of the roll vibration, there is an advantage that the roll vibration generated at the start time of the engine 2 can be absorbed by the two ACMs 10 and the transmission of the roll vibration to the vehicle body frame F (see FIG. 2) can be preferably suppressed.

Especially, the engine 2 (see FIG. 1A) is stopped and restarted frequently if the hybrid vehicle V (see FIG. 1A) has an idle reduction function. Therefore, if the roll vibration is transmitted to the vehicle body frame F (see FIG. 2), a driver may feel uncomfortable.

As the active vibration damping support device 1 (see FIG. 1A) according to the embodiment can preferably suppress the transmission of the roll vibration generated in the engine 2 to the vehicle body frame F, there is an excellent advantage that uncomfortability felt by a driver can be significantly reduced even in the hybrid vehicle V having an idle reduction function.

Without limited to a hybrid vehicle, the present invention may be applied to any vehicle which includes as a cell motor a motor that can output torque large enough to rotate the crankshaft of an engine and set the rotation speed of the engine in advance.

DESCRIPTION OF THE REFERENCE NUMERALS

1 Active vibration damping support device
2 Engine
4 Electric motor
10 ACM
41 Driving unit (actuator)
F Vehicle body frame
V Hybrid vehicle (vehicle)

What is claimed is:

1. An active vibration damping support device provided in a hybrid vehicle and supporting an engine, said vehicle having an electric motor, wherein said motor is driven at a predetermined rotation speed set in advance to starting the engine, and rotates a crank shaft of the engine to start the engine, and, when the engine is started the active vibration damping support device absorbs vibration generated in the engine by expansion and contraction of an actuator, wherein
    when the engine is started, the expansion and contraction of the actuator is started when a predetermined time, set in advance, and corresponding to the time taken for the rotation speed of the engine driven and rotated by an electric motor, to reach a predetermined speed from a stop state has passed since the electric motor was started to be driven.

2. The active vibration damping support device according to claim 1, wherein the predetermined rotation speed is a rotation speed at which roll vibration is generated in the engine.

3. The active vibration damping support device according to claim 1, wherein said motor is an auxiliary driving source of the output of an engine.

4. An active vibration damping support device provided in a hybrid vehicle, and supporting an engine, said vehicle having an electric motor, wherein said motor is an auxiliary driving source of the output of an engine, and, said motor is driven at a predetermined rotation speed set in advance to starting the engine, and rotates a crank shaft of the engine to start the engine, and
    when the engine is started the active vibration damping support device absorbing vibration generated in the engine by expansion and contraction of an actuator, and
    wherein when the engine is started, the expansion and contraction of the actuator is started when a predetermined time, set in advance, and corresponding to the time taken for the rotation speed of the engine driven and rotated by an electric motor, to reach a predetermined speed from a stop state has passed since the electric motor was started to be driven.

5. The active vibration damping support device according to claim 4, wherein the predetermined rotation speed of the engine is the speed at which a roll vibration is generated in the engine.

6. A method of active vibration damping comprising the steps of
    providing an active vibration damping support device for supporting an engine in a hybrid vehicle having an electric motor,
    driving said motor at a predetermined rotation speed set in advance to starting the engine, where the motor rotates a crank shaft of the engine to start the engine,
    providing an actuator which expands and contracts to absorb vibration generated in the engine, and
    setting a predetermined time based on the time taken for the rotation speed of the engine to reach a predetermined speed from a stop state, for starting the expansion and contraction of the actuator.

* * * * *